(12) United States Patent
Benco et al.

(10) Patent No.: US 7,103,352 B2
(45) Date of Patent: Sep. 5, 2006

(54) NETWORK SUPPORT FOR MOBILE HANDSET SCREEN CUSTOMIZATION

(75) Inventors: David S. Benco, Winfield, IL (US); Kevin J. Overend, Elmhurst, IL (US); Baoling S. Sheen, Naperville, IL (US); Sandra L. True, St. Charles, IL (US); Kenneth J. Voight, Sugar Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 218 days.

(21) Appl. No.: 10/761,823

(22) Filed: Jan. 21, 2004

(65) Prior Publication Data
US 2005/0159139 A1    Jul. 21, 2005

(51) Int. Cl.
*H04M 3/42* (2006.01)
*H04Q 7/22* (2006.01)
*H04Q 7/38* (2006.01)

(52) U.S. Cl. .............. 455/414.1; 455/414.3; 455/419; 455/550.1; 455/432.3; 455/566; 705/40; 709/206

(58) Field of Classification Search ............ 455/412.1, 455/414.1, 414.3, 419, 550.1, 566, 432.3; 705/40; 345/919, 625; 709/206
See application file for complete search history.

(56) References Cited

U.S. PATENT DOCUMENTS

| 6,138,009 | A  | * | 10/2000 | Birgerson ................... 455/419 |
| 6,628,971 | B1 | * | 9/2003  | Yoon et al. ................. 455/566 |
| 2002/0045465 | A1 | * | 4/2002 | Kishida et al. ............. 455/566 |
| 2003/0167230 | A1 | * | 9/2003 | McCarthy .................... 705/40 |
| 2003/0218636 | A1 | * | 11/2003 | McIntyre et al. ........... 345/809 |
| 2004/0078439 | A1 | * | 4/2004 | Staack ........................ 709/206 |

FOREIGN PATENT DOCUMENTS

| KR | 2001-110374 | * 12/2001 |
| KR | 2002-079660 | * 10/2002 |

* cited by examiner

*Primary Examiner*—Steve M. D'Agosta

(57) ABSTRACT

Embodiments of the method and system provide for providing network support for an attribute feature for customization of mobile terminals by a telecommunication network. The method in this embodiment may have the steps of: storing in the telecommunication network at least one attribute for use by at least one mobile terminal; sending at least on attribute request from the mobile terminal to the telecommunication network; recognizing, by the telecommunication network, the attribute request from the mobile terminal; downloading, by the telecommunication network, the requested attribute to the mobile terminal; and installing the attribute in the mobile terminal. The system implements the method.

3 Claims, 4 Drawing Sheets

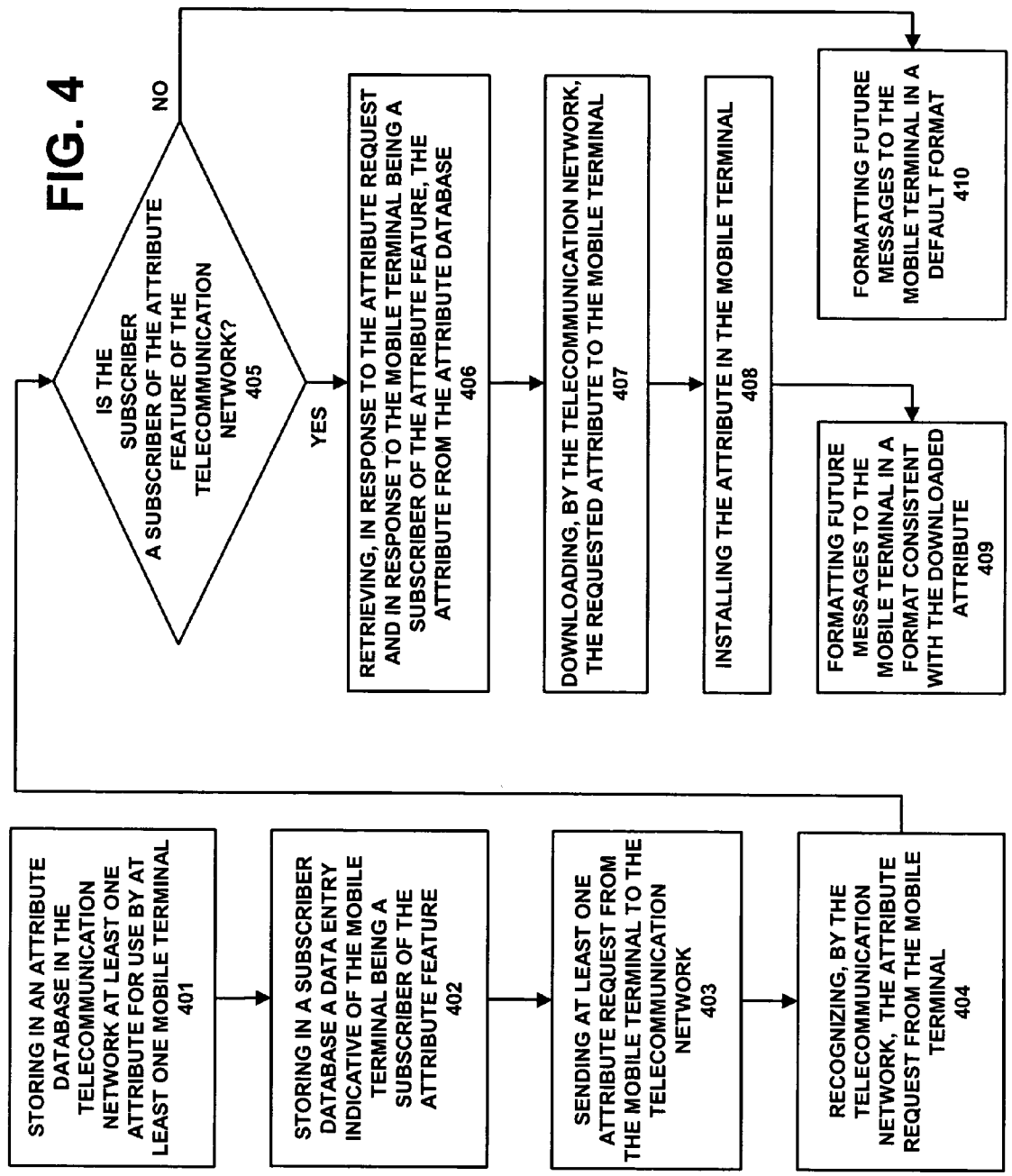

NETWORK SUPPORT FOR MOBILE HANDSET SCREEN CUSTOMIZATION

TECHNICAL FIELD

The present invention relates to wireless telephony in general, and, more particularly, to a method and system that provides network support for screen customization and other modifications of mobile terminals.

BACKGROUND OF THE INVENTION

Mobile subscribers are becoming increasingly connected to their mobile handsets (also referred to as mobile terminals), which are often viewed as a necessary accessory during waking hours. These mobile terminals are used in various environments (e.g., outdoors in sunlight, in dimly-lit restaurants, etc.) It is often desirable to be able to reconfigure the appearance of the terminal's screen in various ways to, for example, enhance readability (e.g., background/foreground colors, font size, etc.).

The display screen of prior art portable terminals is so small for the purpose of portability that only a limited number of display elements can be displayed. Users of desktop computers are well familiar with changing attributes of the screen display, such as background, foreground, desktop images, screen savers, font styles and sizes, etc. Unfortunately, users of mobile terminals, such as cell phones, cannot modify the appearance of the display screens on the mobile terminals. As well as the necessity of modifying mobile terminal displays for increased readability, it is also desirable to modify the appearance of the mobile terminals for just aesthetic reasons. Unlike desktop computers, mobile terminals do not have enough memory to store a large variety of backgrounds, foregrounds, font styles and sizes, and other attributes. Furthermore, in the prior art there is no support by networks for implementing customization of screen displays, for example, for mobile terminals.

It is a drawback of the prior art that there does not exist network support for specifying, for example, the visual appearance of a mobile terminal from a variety of possible foreground and background colors, font styles and sizes, etc. In more general terms prior art systems do not provide network support for an attribute feature for customization of mobile terminals by a telecommunication network.

SUMMARY

The following summary of embodiments of the invention is provided to facilitate an understanding of some of the innovative features unique to the present invention and is not intended to be a full description. A full appreciation of the various aspects of the invention can be gained by taking the entire specification, claims, drawings, and abstract as a whole.

In general terms, an embodiment of the present method for providing network support for an attribute feature for customization of mobile terminals by a telecommunication network. The method in the embodiment may have the steps of: storing in the telecommunication network at least one attribute for use by at least one mobile terminal; sending at least one attribute request from the mobile terminal to the telecommunication network; recognizing, by the telecommunication network, the attribute request from the mobile terminal; downloading, by the telecommunication network, the requested attribute to the mobile terminal; and installing the attribute in the mobile terminal.

Also, in general terms, an embodiment of the present system is a system that provides network support for an attribute feature for customization of mobile terminals by a telecommunication network. The system in this embodiment may have the following components: an attribute menu in a mobile terminal for selecting at least one attribute, the mobile terminal sending an attribute request, indicative of a selected at least one attribute, to the telecommunication network; an attribute database in the telecommunication network in which is stored at least one at least one attribute for use by at least one mobile terminal; a subscriber database in which is stored a data entry indicative of the mobile terminal being a subscriber of the attribute feature; a recognition module in the telecommunication network operatively connected to the mobile subscriber database, the recognition module, upon receiving an attribute request, checking the subscriber database for the mobile terminal being a subscriber of the attribute feature of the telecommunication network, and outputting a confirmation message when the mobile terminal is a subscriber of the attribute feature; and a retrieving module operatively connected to the recognition module and to the attribute database, the retrieving module retrieving, in response to the confirmation message, the at least one attribute from the attribute database; wherein the telecommunication network downloads the requested attribute to the mobile terminal, wherein the attribute in installed in the mobile terminal; and wherein future messages to the mobile terminal are formatted in a format consistent with the

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

FIG. 4 illustrates another flow chart of logical operational steps that may be followed in accordance with one embodiment of the present method and system.

DETAILED DESCRIPTION

The particular values and configurations discussed in these non-limiting examples can be varied and are cited merely to illustrate an embodiment of the present invention and are not intended to limit the scope of the invention.

Methodologies of the present method and system may include at least one of: recognizing subscriber requests to select a particular combination of foreground and background colors; recognizing subscriber requests to select a particular combination of font style and font size; and sending messages formatted for the particular customized mobile terminal to optimize utility and appearance.

Figure 1:
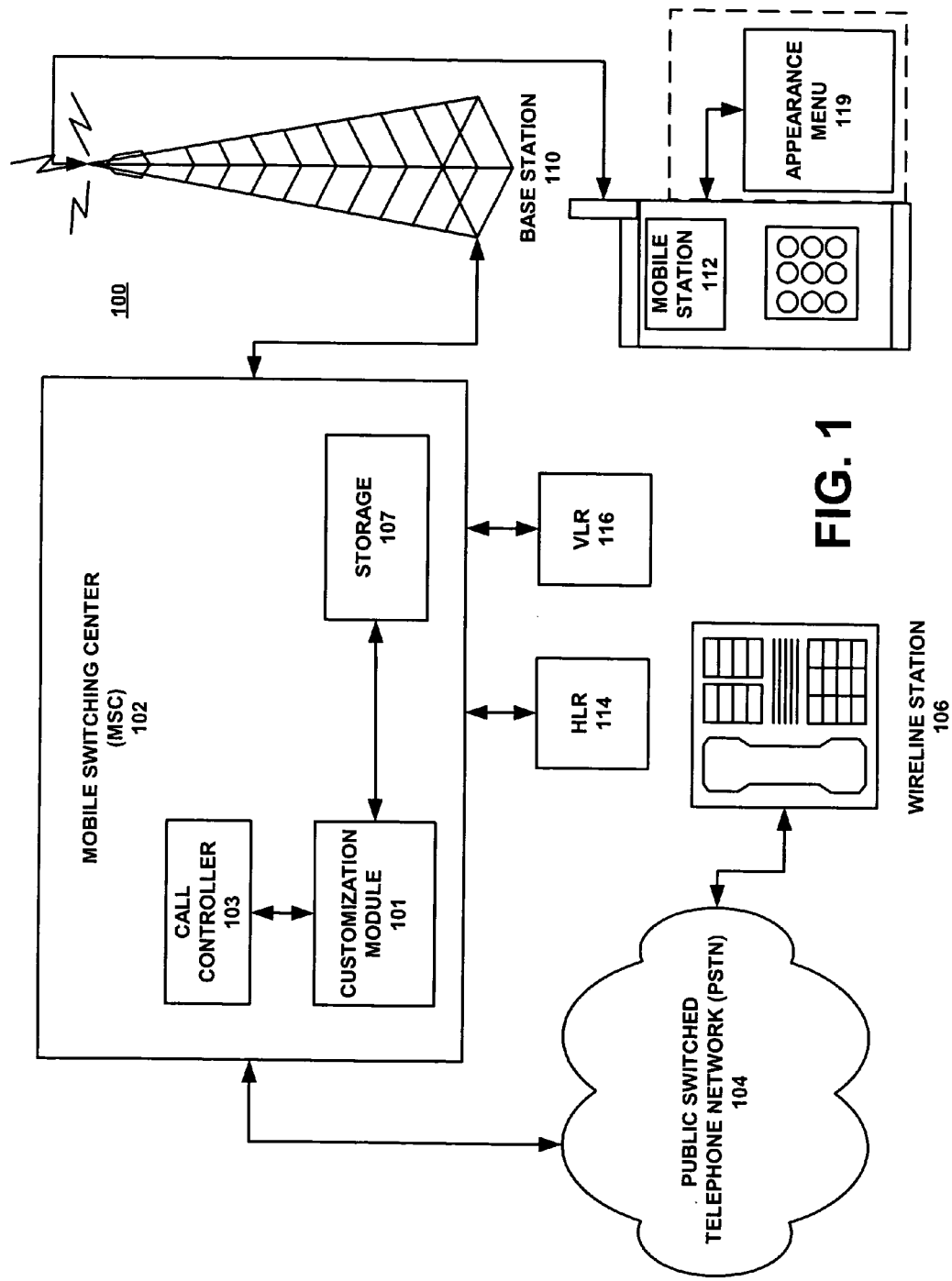
FIG. 1 depicts a block diagram illustrative of a mobile switching center, base station and mobile terminal for use with the present method and system.

Referring to FIG. 1, a network 100 is depicted for at least one mobile terminal of a plurality of mobile terminals operatively connected to a communication network. Although the present system and method may be used with any type of network (wired and wireless, for example), the subscriber may typically be a mobile subscriber who uses a mobile terminal (also referred to as mobile phone, a cell phone, mobile handset, or car phone). The network (or telecommunication network) 100 may have a mobile switching center (MSC) 102. The network may be, or may be part of, one or more of a telephone network, a local area network ("LAN"), the Internet, and a wireless network. In the depicted embodiment, a public switched telephone network (PSTN) 104 is connected to the MSC 102. The PSTN 104 routes calls to and from mobile users through the MSC 102. The PSTN 104 also routes calls from and to wireline stations 106. The MSC 102 may also be connected to one or more base stations (BS) 110. Each of the base stations 110 communicates with mobile terminal(s) 112 in its service area. The PSTN 104 generally can be implemented as the worldwide voice telephone network accessible to all those with telephones and access privileges (e.g., AT&T long distance network).

Each of the mobile terminals 112 may have a home location register (HLR) 114 where data about each of the mobile terminals 112 resides. Some of the mobile terminals 112 may be remotely located from their home location, and in that case, a visiting location register (VLR) 116 is set up locally for each mobile terminal 112 that is visiting in its service area. HLR 114 can be implemented as a permanent SS7 database utilized in cellular networks, such as, but not limited to, for example, AMPS (Advanced Mobile Phone System), GSM (Global System for Mobile Communications), and PCS.

HLR 114 may be utilized generally to identify/verify a subscriber, and also contains subscriber data related to features and services. HLR 114 is generally utilized not only when a call is being made within a coverage area supported by a cellular provider of record, but also to verify the legitimacy and to support subscriber features when a subscriber is away from his or her home area. VLR 116, on the other hand, may be implemented as a local database maintained by the cellular provider whose territory is being roamed. Mobile terminal 112 may be implemented as a cellular device, personal communication device, short message service device or wireless communications device (e.g., a wireless personal digital assistant).

The MCS 102 may have, or be operatively connected to, components of a system for screen customization of mobile terminals by a telecommunication network. Such components in some embodiments may include: customization module 101, call controller 103 and storage 107 (such as a subscriber database) in the MCS 102; and an appearance menu 118 in the mobile terminal 112. The appearance menu 118 may be used to request that attributes be downloaded from the network 200 to the mobile terminal 112. In one embodiment the downloaded attributes may customized the screen display on the mobile terminal 112.

Figure 2:
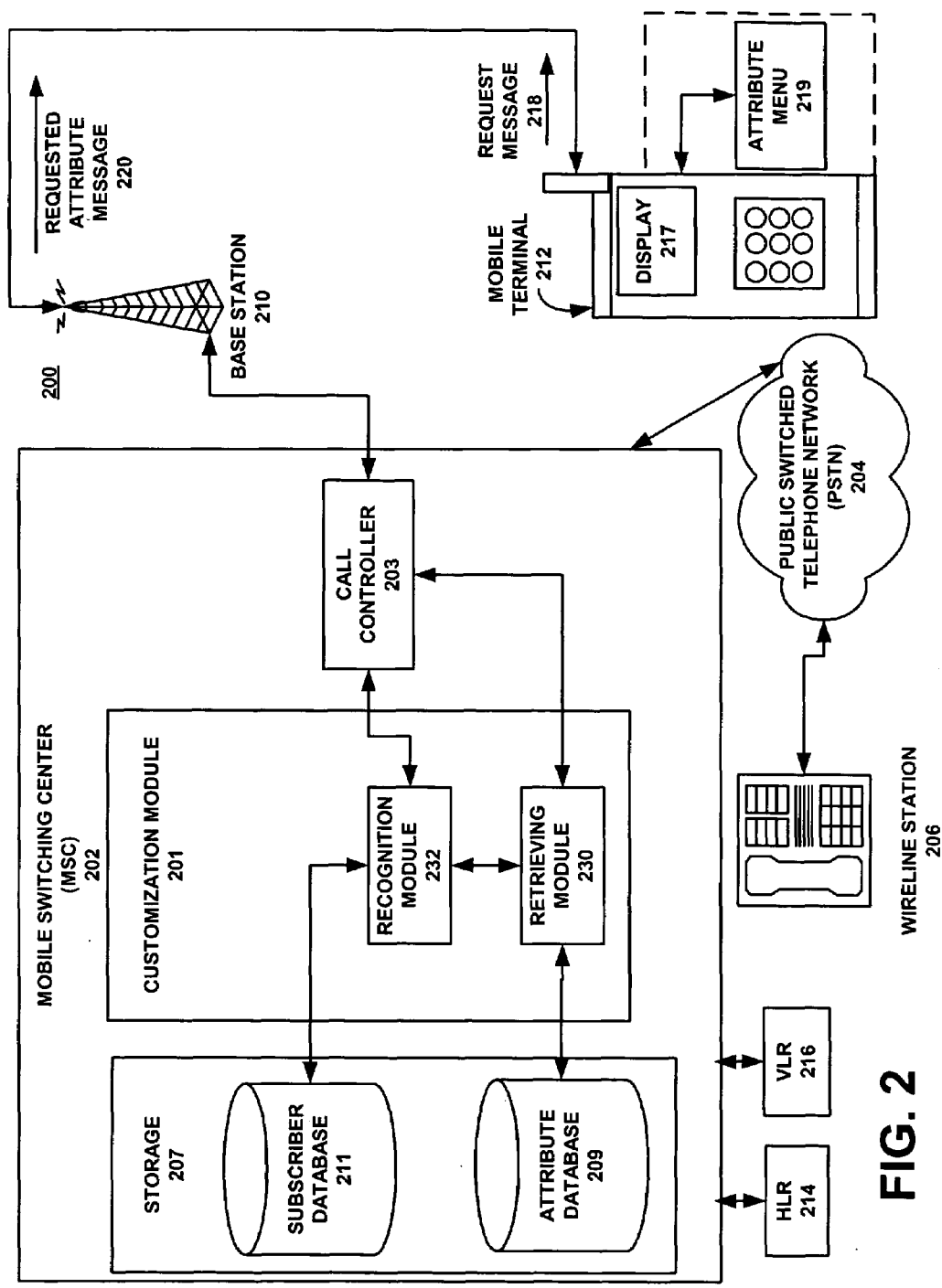
FIG. 2 illustrates a more detailed block diagram illustrative of a mobile switching center, base station, and mobile terminal according to one embodiment of the present method and system.

Referring to FIG. 2, a network (or telecommunication network) 200 is shown for at least one mobile terminal 212 of a plurality of mobile terminals operatively connected to a telecommunication network having a mobile switching center 202. FIG. 2 depicts a block diagram that is illustrative of a mobile switching center 202 operatively connected to PSTN 204, base station 210, and mobile terminal 212 according to one embodiment of the present method and system. The PSTN 204 routes calls to and from mobile users through the MSC 202, and also routes calls from and to wireline stations 206. The MSC 202 is connected to one or more base stations 210. The base station(s) 210 communicates through the air to mobile terminals 212, which, for example, may be of a cellular telephone type or of the wider bandwidth personal communication device type. Mobile terminals 212, for example, may be wireless handsets or automobile mounted stations the same as those shown in FIG. 1. The MSC 202 has operatively connected thereto a VLR 216 and a HLR 214 that interface with the mobile terminal 212 as explained above.

In one embodiment of the system for providing an attribute feature by a telecommunication network 200 to mobile terminals 212, may have attributes, such as, background colors, foreground colors, font styles, font sizes, images, low-light level mode, and bright-light level mode. The request 218 may also be for a plurality of attributes in an attribute package. Other attributes may include the specification of "Expert" vs. "Detailed" menu mode, selection of one of several alternate "soft key" layouts, etc. The difference between an "Expert" menu mode and a "Detailed" menu mode may be, for example, a difference in the number of selections.

In one embodiment the network 200 is aware of the customization appearance capability (attribute feature) of the mobile terminal 212 by a data entry maintained in the mobile subscriber database 211. Navigation through a screen customization menu 219, displayed on the mobile terminal 212, and selection of a menu item by the mobile subscriber results in a screen customization request message (such as, request message 220) being sent to the network 200 (such as, mobile switching center 202). The menu 219 may allow individual attribute-by-attribute specification as well as provide packaged attributes (e.g., "low-light", "bright-light", "large-print", etc.). Upon recognizing a request message 218, the network 200 may automatically download the requested attribute(s) (such as, foreground, background, font style, and font size) to the mobile terminal 212, thus changing its visual appearance. In another embodiment future messages to the mobile terminal 212 from the network 200 may formatted in a manner consistent with the selected font attributes (e.g., more detailed output for smaller font sizes, etc.).

As depicted in FIG. 2 a subscriber may use an attribute menu 219 in a mobile terminal 212 for selecting at least one attribute, the mobile terminal 212 sending an attribute request 218, indicative of a selected at least one attribute, to the telecommunication network 200. The request 218 is formed in the mobile terminal 212 by the subscriber selecting one or more entries from a customization menu downloaded to the mobile terminal 212 by the network 200 when this feature is active. The transmission of a menu selection from a mobile terminal 212 to the network 200 is well-understood in the prior art. An attribute database 209 in the telecommunication network 200 stores at least one at least one attribute for use by at least one mobile terminal 212. A subscriber database 211 stores a data entry indicative of the mobile terminal 212 being a subscriber of the attribute feature. A recognition module 232 in the telecommunication network 200 is operatively connected to the mobile subscriber database 211. The recognition module 232, upon receiving an attribute request message 218, checks the subscriber database 211 for the mobile terminal 212 being a subscriber of the attribute feature of the telecommunication network 200, and outputs a confirmation message of other type of signal when the mobile terminal 212 is a subscriber of the attribute feature. A retrieving module 230 is operatively connected to the recognition module 232 and to the attribute database 209. The retrieving module 230 retrieves, in response to the confirmation message from the recognition module 232, the at least one attribute from the attribute database 209. The telecommunication network then downloads the requested attribute to the mobile terminal 212, wherein the attribute in installed in the mobile terminal 212. Further messages to the mobile terminal 212 are formatted in a format consistent with the downloaded attribute. If the mobile terminal 212 has not been customized, the future messages to the mobile terminal 212 are formatted in a default format.

The recognition module 232 identifies the menu option selected by the subscriber and transmitted to the network 200, by extracting the number of the menu item selected by the subscriber. The retrieving module 230 retrieves the attributes by using the number of the menu item selected as an index into the attribute database 209.

The messages may be exchanged between the telecommunication network 200 and the mobile terminal 212 via at least one of email, SMS, and data for display on the display 217 of the mobile terminal 212. Embodiments of the messages and the format for sending the messages may take many different forms in various embodiments of the present method and system.

Figure 3:
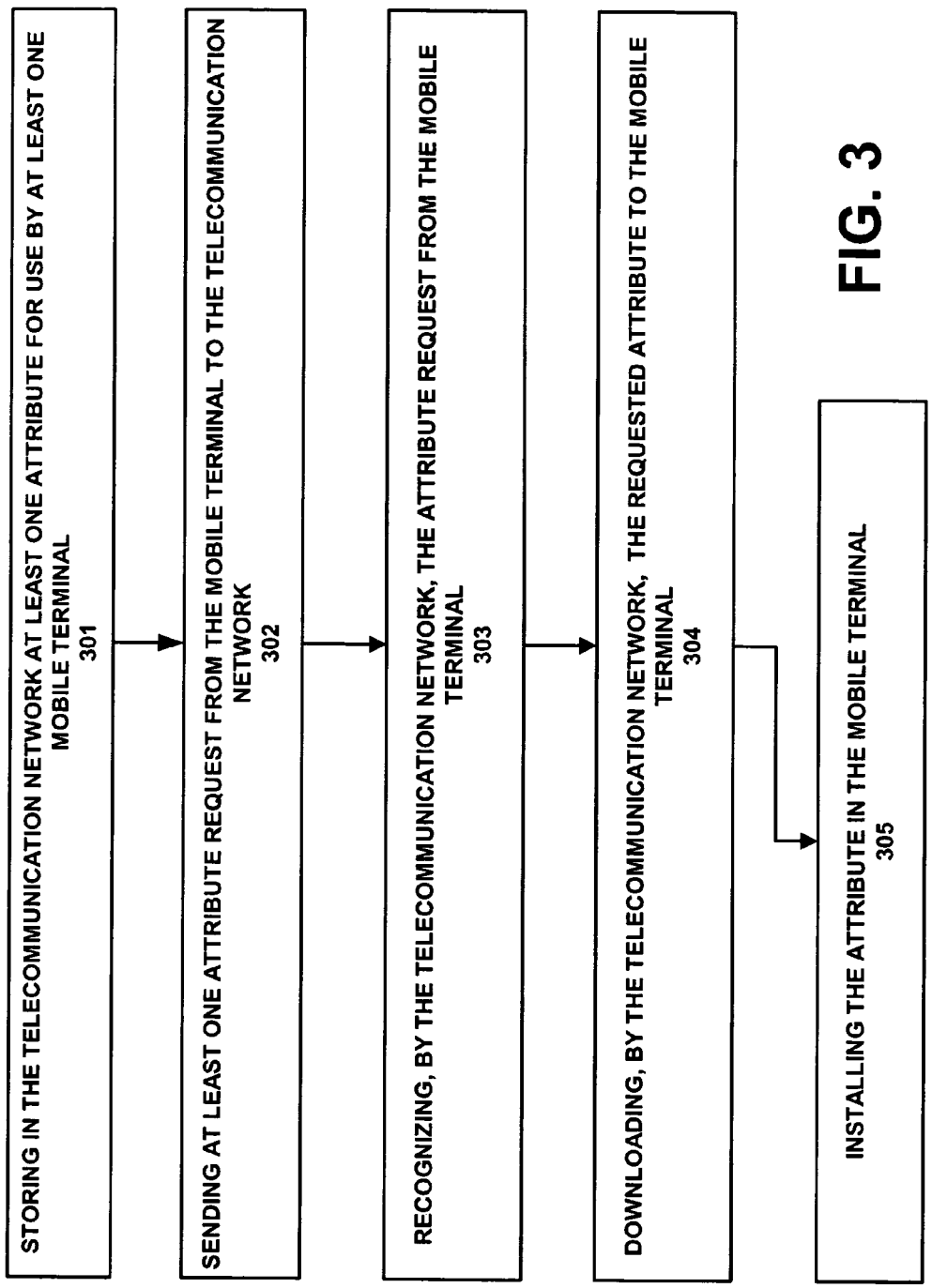
FIG. 3 illustrates a very general flow chart of logical operational steps that may be followed in accordance with one embodiment of the present method and system.

FIG. 3 is a general block diagram depicting an embodiment of the present method. In very general terms, the method has the steps of: storing in the telecommunication network at least one attribute for use by at least one mobile terminal (step 301); sending at least one attribute request from the mobile terminal to the telecommunication network (step 302); recognizing, by the telecommunication network, the attribute request from the mobile terminal (step 303); downloading, by the telecommunication network, the requested attribute to the mobile terminal (step 304); and installing the attribute in the mobile terminal (step 305).

FIG. 4 is a block diagram depicting another embodiment of the present method. This embodiment of the method may have the steps of: storing in an attribute database in the telecommunication network at least one attribute for use by at least one mobile terminal (step 401); storing in a subscriber database a data entry indicative of the mobile terminal being a subscriber of the attribute feature (step 402); sending at least one attribute request from the mobile terminal to the telecommunication network (step 403); recognizing, by the telecommunication network, the attribute request from the mobile terminal (step 404); checking, upon receiving an attribute request, the subscriber database for the mobile terminal being a subscriber of the attribute feature of the telecommunication network (step 405); retrieving, in response to the attribute request and in response to the mobile terminal being a subscriber of the attribute feature, the attribute from the attribute database (step 406); downloading, by the telecommunication network, the requested attribute to the mobile terminal; installing the attribute in the mobile terminal (step 407); installing the attribute in the mobile terminal (step 408); and formatting future messages to the mobile terminal in a format consistent with the download attribute (step 409). If the mobile terminal is not a subscriber of the attribute feature, future messages to the mobile terminal are formatted in a default format (step 410).

Therefore, the improved present method and system implements network support for specifying, for example, the visual appearance of a mobile terminal from a variety of possible foreground and background colors, font styles and sizes, etc. In more general terms the present method and system overcome the drawbacks of the prior art by providing network support for an attribute feature for customization of mobile terminals by a telecommunication network.

The present system and method may be used with non-mobile phones, as well as, mobile phones. Also, different types of data storage devices may be used with the present method and system. For example, a data storage device may be one or more of a magnetic, electrical, optical, biological, and atomic data storage medium.

The method and system of the present invention may be implemented in hardware, software, or combinations of hardware and software. In a software embodiment, portions of the present invention may be computer program products embedded in computer readable medium. Portions of the system may employ and/or comprise a set and/or series of computer instructions written in or implemented with any of a number of programming languages, as will be appreciated by those skilled in the art.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of the illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

What is claimed is:

1. A method for providing network support for an attribute feature for customization of mobile terminals by a telecommunication network, the method comprising the steps of:

storing in the telecommunication network at least one attribute for use by at least one mobile terminal;

sending at least one attribute request from the mobile terminal to the telecommunication network, the attribute request being a request of a plurality of attributes in an attribute package and the attribute package being a combination of at least two of; background colors, foreground colors, font styles, font sizes, images, low-light level mode, and bright-light level mode;

recognizing, by the telecommunication network, the attribute request from the mobile terminal;

storing in a subscriber database a data entry indicative of the mobile terminal being a subscriber of the attribute feature;

checking, upon receiving an attribute request, the subscriber database for the mobile terminal being a subscriber of the attribute feature of the telecommunication network;

downloading, by the telecommunication network, the requested attribute to the mobile terminal; and installing the attribute in the mobile terminal.

2. A method for providing network support for an attribute feature for customization of mobile terminals by a telecommunication network, the method comprising the steps of:

storing in an attribute database in the telecommunication network at least one attribute for use by at least one mobile terminal;

storing in a subscriber database a data entry indicative of the mobile terminal being a subscriber of the attribute feature;

sending at least one attribute request from the mobile terminal in the telecommunication network, the attribute request being a request for a plurality of attributes in an attribute package and the attribute package being a combination of at least two of: background colors, foreground colors, font styles, font sizes, images, low-light level mode, and bright-light level mode;

recognizing, by the telecommunication network, the attribute request from the mobile terminal;

checking, upon receiving an attribute request, the subscriber database for the mobile terminal being a subscriber of the attribute feature of the telecommunication network;

retrieving, in response to the attribute request and in response to the mobile terminal being a subscriber of the attribute feature, the attribute from the attribute database; downloading, by the telecommunication network, the requested attribute to the mobile terminal;

installing the attribute in the mobile terminal; and formatting future messages to the mobile terminal in a format consistent with the downloaded attribute.

3. A system that provides network support for an attribute feature for customization of mobile terminals by a telecommunication network, the system comprising:

an attribute menu in a mobile terminal for selecting at least one attribute, the mobile terminal sending an attribute request, indicative of a selected at least one attribute, to the telecommunication network, the attribute package being a combination of at least two of: background colors, foreground colors, font styles, font sizes, images, low-light level mode, and bright-light level mode;

an attribute database in the telecommunication network in which is stored at least one at least one attribute for use by at least one mobile terminal;

a subscriber database in which is stored a data entry indicative of the mobile terminal being a subscriber of the attribute feature;

a recognition module in the telecommunication network operatively connected to the mobile subscriber database, the recognition module, upon receiving an attribute request, checking the subscriber database for the mobile terminal being a subscriber of the attribute feature of the telecommunication network, and outputting a confirmation message when the mobile terminal is a subscriber of the attribute feature; and a retrieving module operatively connected to the recognition module and to the attribute database, the retrieving module retrieving, in response to the confirmation message, the at least one attribute from the attribute database;

wherein the telecommunication network downloads the requested attribute to the mobile terminal, wherein the attribute in installed in the mobile terminal; and wherein future messages to the mobile terminal are formatted in a format consistent with the downloaded attribute.

* * * * *